J. G. L. HEIDENREICH.
FLOUR DRESSING MACHINE.
APPLICATION FILED JULY 18, 1912.
1,053,811.
Patented Feb. 18, 1913.
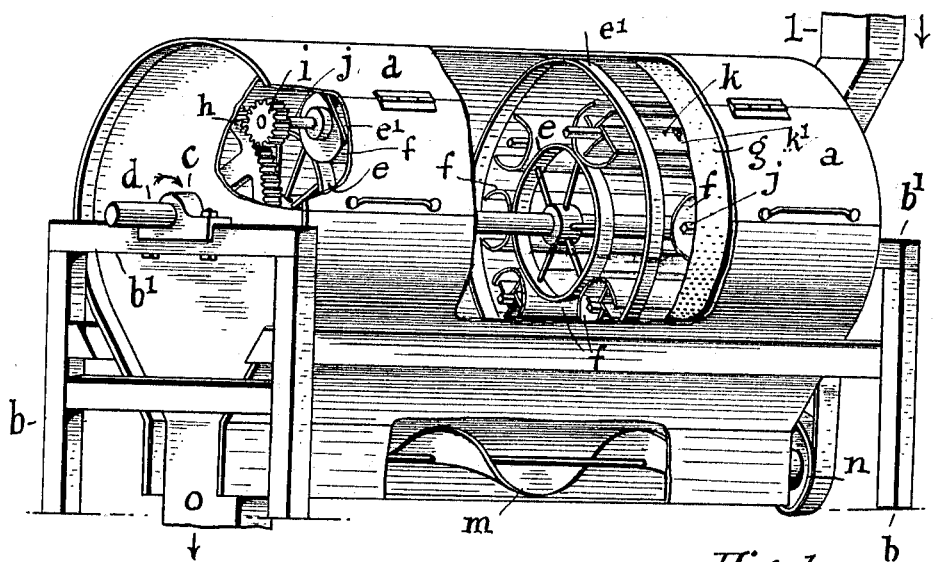
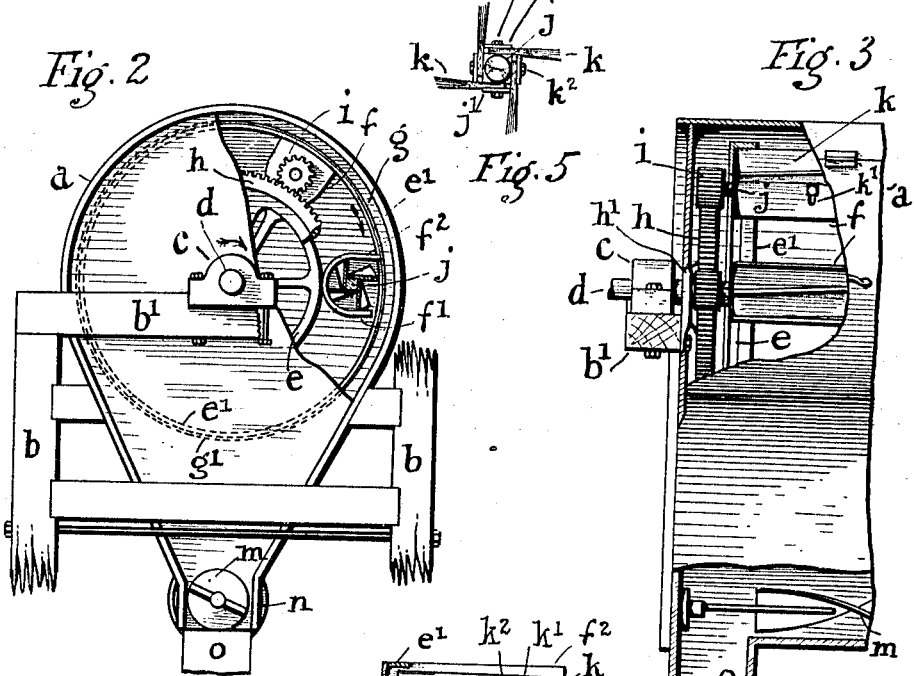
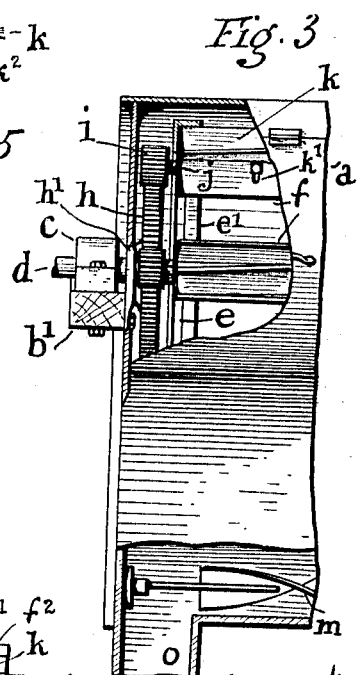
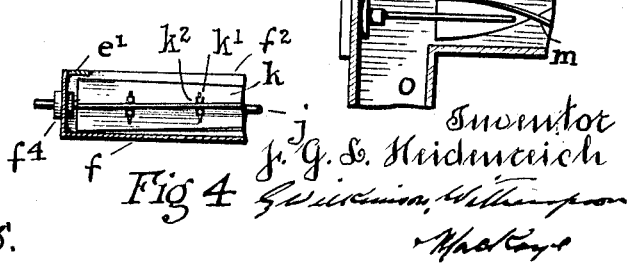

UNITED STATES PATENT OFFICE.

JOHN GEORGE LUDWIG HEIDENREICH, OF WEST MELBOURNE, VICTORIA, AUSTRALIA.

FLOUR-DRESSING MACHINE.

1,053,811. Specification of Letters Patent. Patented Feb. 18, 1913.

Application filed July 18, 1912. Serial No. 710,275.

*To all whom it may concern:*

Be it known that I, JOHN GEORGE LUDWIG HEIDENREICH, a subject of the King of Great Britain and Ireland, &c., residing at West Melbourne, in the State of Victoria, Commonwealth of Australia, have invented certain new and useful Improvements in Flour-Dressing Machines; and I do hereby declare the following to be a full, clear, and exact description of the invention, such as will enable others skilled in the art to which it appertains to make and use the same.

The object of this invention is to provide an improved centrifugal machine for dressing flour, whereby space and power are economized.

I employ a comparatively short drum having a silk or other suitable screen, and discard the ordinary beaters, and substitute a series of small beaters each working in a special trough which will revolve together with the said screen. Flour is fed inside the drum. The sifting through the screen will be rapid. Before it passes the silk, the flour will receive less beating and agitation in the air than in common centrifugal dressing machines. This is of utility, because it is injurious to flour to be overdried and overbeaten during the process of dressing it. The latter results are found to readily occur when the large beaters hitherto usual are used. The base of my drum will not be loaded heavily with stock to be dressed, as in common centrifugal machines. I provide in my troughs conveyer brushes or beaters which throw or work the flour against the trough portion of the screen, so that some flour will pass through, while the residue will be discharged at the trough end.

My construction causes a minimum amount of the natural moisture of the flour to be removed from the latter, as I employ a less powerful wind, and less violent beaters. These differences necessitate changes of construction such as those which I illustrate in the drawings herewith.

Figure 1 shows my machine in perspective with parts of the casing removed to exhibit the interior. Fig. 2 is an end elevation also broken to show part of the interior. Fig. 3 is a side elevation with casing broken away to illustrate the interior. Fig. 4 illustrates part of a conveyer fan with the end of a trough in section, and Fig. 5 is an end elevation of beaters or fans in brush form.

The machine has, as to size, form and material any suitable outer casing conveniently supported. Thus $a$ is a casing on trestles or framing $b$, the top of which $b^1$ carries bearings $c$ in which rotates (for example in the direction shown by an arrow) a main shaft $d$ having mounted thereon at intervals as by keying, a number of spider wheels or frames $e$, which carry as by their crowns, a series of longitudinal troughs $f$, the number being variable; they are set around in a ring and could be set closer together than as shown. The troughs have outwardly extending limbs which touch, or extend nearly to outer hoops or bands $e^1$ which support the silk or other screen $g$ and which thus rotate with the latter. The drum having the said screen is rotated by shaft $d$, loosely inclosing which is a toothed wheel $h$, supported in such manner that it will not rotate, as by a bracket $h^1$ (see Fig. 3) extending to the framing.

The troughs $f$ have longitudinal conveying and fanning or beating means, as spindles $j$, each supported at each end of its trough as by a boss $f^4$ (see Fig. 4). Each such spindle carries the fans or beaters $k$ of any suitable form, number, and material such as will not cut the silk or other screen, strips of felt, or rubber, or brushes being suitable. A pinion $i$ on each spindle meshes with the fixed wheel $h$, and thus as the drum and troughs rotate, the pinions are driven causing the beaters $k$ to also rotate, but much faster than the screen. The trough walls or sides are of unequal length or there are gaps or slots in the leading side. Thus side $f^1$ does not come to the screen being made shorter than the following side $f^2$. In this way each trough will as it rotates act as a scoop and will pick up flour from the bottom of the screen interior, the flour thus picked up supplies the beaters and is conveyed by the latter as described later.

The flour is caused to enter the machine at a suitable point or points as through feed chute 1, which delivers it into the center of the drum so that it falls onto the bottom dotted at $g^1$ in Fig. 2 of the interior of the screen $g$, where it is ready to be depleted as each trough picks up some of it by feeding itself as stated. The fan members, brushes or blades are provided with a spiral or screw curve so as to be able to convey flour picked up at the feed end or other part of a trough along to the delivery end which has an exit or discharge chute $o$. The beaters $k$ are in some cases provided with slots $k^1$ through which pass set screws $k^2$ into spindle $j$ which may be relatively thicker than is shown, and the beaters can thus be adjusted from time to time nearer to or more distant from the screen. Under the screws there may be washers or strips $j^1$ as in Fig. 5 to assist in firmly adjusting or holding down the members $k$. The material forced or sifted through the screen $g$ falls into a chamber of the base of the casing $a$ and is received by a conveyer screw or the like $m$ which is rotated as by a belt $n$ from a shaft $d$. Thus the sifted or dressed flour moves to exit $o$.

There may be a plurality of screws as $m$ each in a separate chamber, and with details as at present used in other flour dressing machines, but this part of the construction (which is not claimed) may vary or be omitted.

Having described this invention what is claimed by Letters Patent is:—

In a dressing machine, the combination of a casing; a cylindrical frame mounted to rotate in said casing; a fabric overlying the frame and adapted to receive the material; a trough mounted on the frame, said trough having its open side disposed toward the fabric, and having one edge disposed against the fabric surface; a shaft journaled in the trough; a beater mounted on the shaft and adapted to operate against the fabric surface; a stationary gear wheel; and a pinion mounted on the shaft meshing with said gear wheel, and operable to rotate said beater through the rotation of said frame, substantially as described.

In witness whereof I have hereunto set my hand in the presence of two witnesses.

JOHN GEORGE LUDWIG HEIDENREICH.

Witnesses:
GEORGE G. TURRI,
MARGARET J. FRY.

Copies of this patent may be obtained for five cents each, by addressing the "Commissioner of Patents, Washington, D. C."